United States Patent [19]

Pelagio et al.

[11] 4,150,937
[45] Apr. 24, 1979

[54] APPARATUS FOR FORMING FILAMENTS

[75] Inventors: Gregory A. Pelagio; Charles J. Stalego, both of Newark, Ohio; Wiley B. Holland, Attelboro, Mass.

[73] Assignee: Owens-Corning Fiberglas Corporation, Toledo, Ohio

[21] Appl. No.: 809,487

[22] Filed: Jun. 23, 1977

[51] Int. Cl.$^2$ .................. B29C 25/00; B29F 3/00
[52] U.S. Cl. ........................ 425/464; 65/12; 65/16; 74/424.8 B; 264/176 F; 425/72 S; 425/382.2; 425/404
[58] Field of Search ............... 74/424.8 B; 264/176 F, 264/93; 425/72 S, 326.1, 387.1, 404, 445, 363, DIG. 236, 382.2, 464, 463; 65/12, 16, 1, 2, 5

[56] References Cited

U.S. PATENT DOCUMENTS

| 2,446,624 | 8/1948 | Allison | 74/424.8 B |
| 3,502,763 | 3/1970 | Hartmann | 425/72 S |
| 3,985,488 | 10/1976 | Hoffmann | 425/363 |

Primary Examiner—Roy Lake
Assistant Examiner—Mark Rosenbaum
Attorney, Agent, or Firm—Ronald C. Hudgens; Philip R. Cloutier; Greg Dziegielewski

[57] ABSTRACT

Apparatus is provided for fluidically attenuating streams of material into filaments wherein a plurality of elements are adjustably mounted for movements substantially along and transverse to the path of advancement of the filaments and for lateral movement with respect to each other.

7 Claims, 4 Drawing Figures

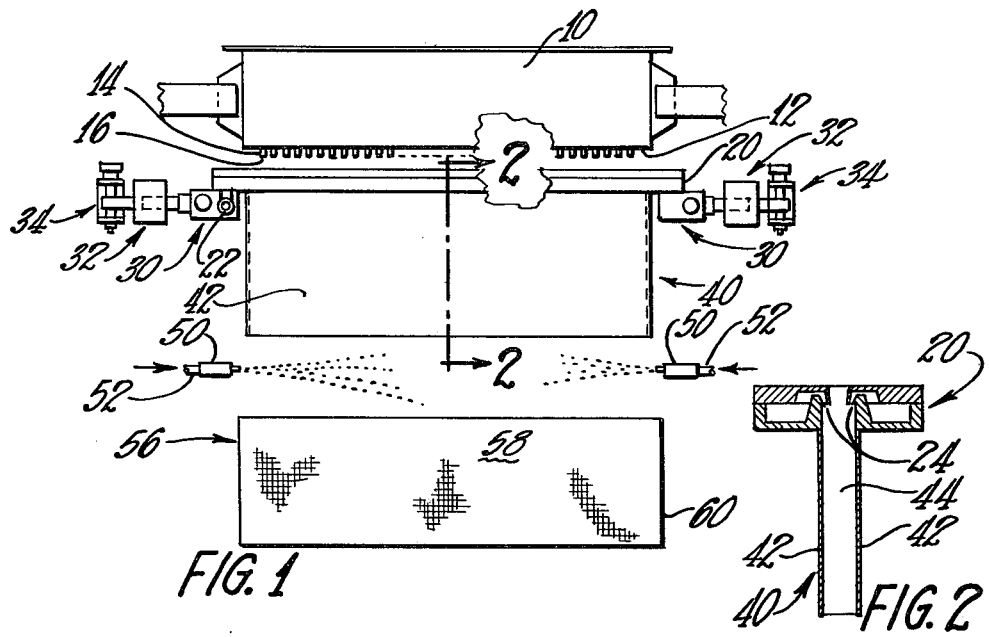
FIG. 1
FIG. 2
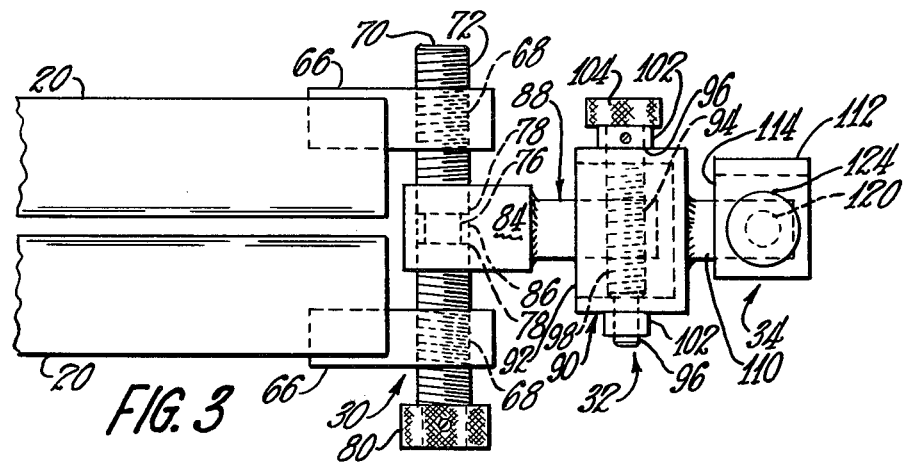
FIG. 3
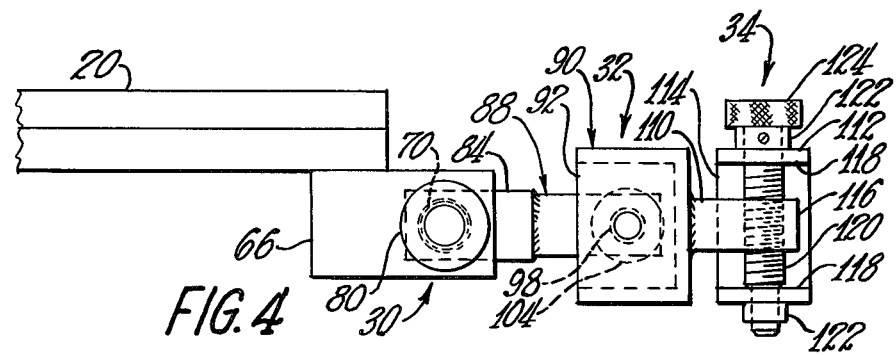
FIG. 4

APPARATUS FOR FORMING FILAMENTS

This invention pertains to apparatus for attenuating filaments. In one of its more specific aspects, the present invention relates to attenuating filaments with blasts of air from a blower which is movable with respect to the fiber forming orifices.

In the past filaments have been formed by using feeders for holding molten material. There is a plurality of orifices located in the lower region of the feeder and streams of molten material issue from the orifices. The streams of molten material pass between two blowers located beneath the feeder and jets of air from the blowers attenuate the streams of molten material into filaments. The filaments that are formed can be either collected in a loose bundle or formed into a strand and wound onto a package.

One of the most significant variables in this filament forming process is the heat of the lower region of the feeder in the vicinity of the orifices. The temperature of this region of the feeder controls the rate at which the filaments can be formed and also is a significant factor in establishing the diameter of the attenuated filament. Traditionally, the temperature of the region of the feeder in the vicinity of the orifices has been controlled by controlling the supply of energy to the feeder. Also, the terminals that are used to supply the electrical energy to the feeder can be moved to somewhat change the heat pattern or temperature of the feeder in the region of the orifices.

However, the above methods of temperature control do not completely control the temperature or heat pattern in the lower region of the feeder. Frequently localized hot or cold spots develop on the lower region of the feeder. These temperature nonuniformities disrupt the filament forming process. Consequently, the filaments formed in the area of the feeder containing the hot or cold spots do not contain the desired characteristics. The temperature variations can cause the filament forming process to cease.

According to the invention there is provided apparatus for attenuating filaments from streams of molten material issuing from orifices in a feeder, the apparatus comprising a plurality of elements, in spaced apart relationship, adapted for the passage of a fluid therethrough. A first integral means is provided to vary the space between the elements. A second integral means is provided to move the elements in a direction perpendicular to the longitudinal axes of the filaments being attenuated. The second means is connected to the first means. A third integral means is provided to move the elements in a direction that is parallel to the longitudinal axes of the filaments being attenuated. The third means is connected to the second means.

The invention of this application can be used to form filaments from almost all heat softenable filament forming material. The invention is particularly useful, however, in forming glass filaments. Accordingly, the invention will be described in terms of attenuating glass filaments. However, this is for illustration purposes only and it should be understood that the invention can be used to attenuate other materials into filaments.

DESCRIPTION OF THE DRAWINGS

FIG. 1 is a front elevation view of the filament forming apparatus.

FIG. 2 is a partial cross sectional view taken along line 2—2.

FIG. 3 is a partial top view of the filament forming apparatus.

FIG. 4 is a partial side elevation view of the filament forming apparatus.

In FIG. 1 there is shown a feeder 10 for supplying molten glass that is to be formed into filaments from either a bushing having tips or a tipless bushing. The invention will be explained with reference to the former. The lower region 12 of the feeder contains a plurality of tips 14. Each of the tips is adapted with an aperture 16 that opens through the tip and into the feeder.

Below the feeder is a pair of blower elements 20 that are positioned along each side of the longitudinal row of tips in the feeder. The blower elements are in spaced-apart relationship with respect to the tips on the feeder. An inlet 22 is positioned at one end of the blower for introducing a fluid into the blower. One surface of each blower element is adapted with a plurality of apertures 24.

Positioned at each end of the blower elements is means 30 for moving the elements to vary the space between the blower elements. Connected to means 30 is means 32 for moving the elements in a direction perpendicular to the longitudinal axes of the filaments being attenuated. And connected to means 32 is means 34 for moving the blower elements in a direction parallel to the longitudinal axes of the filaments being attenuated.

Positioned beneath the blower elements 20 is skirt 40, connected to the lower region of the blower elements and defining a generally rectangular-shaped pasageway beneath the blower elements. The skirt has side walls 42 and 44.

Located beneath the skirt is a plurality of spray nozzles 50 that are used to spray a coating onto the filaments. Conduit 52 connects the spray nozzles with a source of coating material, not shown.

Beneath the spray nozzles can be positioned container 56 for collecting the filaments that are formed. The side walls 58 and end walls 60 of the container are normally formed of a porous material.

In FIGS. 3 and 4 additional details of the means for moving the blower elements are shown. A support member 66 is connected to the lower surface of the blower element. Each of the support members is drilled and tapped with threaded opening 68 to accept threaded rod, or bolt, 70. The bolt is divided into two separate threaded portions. The first portion 72 is threaded with right-handed threads and passes through the threaded opening on only one of the support members. The second portion 74 of the bolt, is threaded with left-handed threads and passes through only the threaded aperture on the remaining support member located on that end of the blower elements. As noted, the threads on the first and second portions are threaded in opposite directions. The oppositely-threaded first and second portions of the bolt are separated by an unthreaded portion 76. The unthreaded portion of the bolt is located midway between the support members. At each end of the unthreaded portion of the bolt is positioned bearing 78. At one end of the threaded section of the bolt is a knob 80 which facilitates rotation of the bolt.

Connected to the bolt is a member 84, extending away from the blower elements 20. Member 84 is adapted with aperture 86 and bolt 70 passes through the aperture. The aperture on the member will normally be positioned over the unthreaded portion of the bolt with bearings 78 being positioned for support thereof. At the other end of the member 84 there is an element 88 that projects from the member.

The element 88 extends into a support housing 90 through side 92. The portion of the element that extends into the support housing is adapted with threaded opening 94. The support housing is adapted with aperture 96 and the apertures in the end walls of the support housing are in matched relation with the threaded opening in the element. Threaded member 98 extends through the apertures in the support housing and through the threaded opening in the element. The threaded member is supported by bearings 102 that are located on each end of the threaded member and the bearings are connected to the end walls of the support housing. Knob 104 is located on one end of the threaded member.

Connected to the support housing 90 is member 110 which extends from the support housing into housing 112 through the side wall 114 of the housing. The portion of the member that extends into the housing is adapted with threaded opening 116. The two end walls of the housing are adapted with apertures 118 in matched relationship with the threaded opening in the member. Threaded member 120 extends through the apertures 118 in the end walls of the housing and through the threaded opening 116 in the member. Each end of the threaded member passes through bearings 122 that are connected to the end walls of the housing. The bearings act to support the threaded member and to maintain it in the proper position with respect to the housing. On one end of the threaded member there is positioned knob 124.

In operation, molten material passes from the feeder through the orifices in the tips in the form of streams. The streams flow from the tips through the passageway between blower elements 20. Fluid passing from apertures 24 in the blower elements engage the streams of molten material and attenuate the streams into filaments. The attenuated filaments pass into the rectangular passageway formed by the skirt 40 directly below the blower elements. The fluid exhausting from the apertures 24 creates a turbulent flow pattern in the skirt 40. The turbulent flow causes the attenuated filaments to strike against the walls of the skirt and break.

As the short fibers exit the skirt 40, spray nozzles 50 spray coating or sizing onto the filaments. The coating sprayed from the nozzles acts to protect the filaments from further abrasion. After the filaments have been coated they are collected in a container 56. The porous walls of the container allow the air used to attenuate the filaments to escape from the container but retain the fibers within the container.

In operation, the position of the blower elements 20 with respect to the tips 14 will affect the temperature of the tips which is an important factor in the formation and attenuation of the streams of molten material. To control the relationship of the tips and the blower elements, means 30 for varying the space between the elements, means 32 for moving the elements in a direction perpendicular to the longitudinal axes of the filaments being attenuated and means 34 for moving the elements in a direction parallel to the longitudinal axes of the filaments are provided.

In means 30, bolt 70 controls the space between the blower elements. When bolt 70 is rotated by turning knob 80 the support member 66 moves along the bolt is the bolt passes through threaded aperture 68 located on the support members. Since the first and second portions of the bolt are threaded in opposite directions, when the bolt is rotated the support members will move either toward one another or away from one another. Since each of the support members is connected to one end of the blower elements, when the support members are moved by the rotation of the bolt, this will, in turn, cause the ends of the blower elements to move. Since the support members either move toward or away from one another, the ends of the blower elements will also move either toward or away from one another. This movement of the blower elements alters the space between the two blower elements. Normally the threads on the bolt are positioned so that the space between the blower elements will decrease when the threaded rod is rotated in a clockwise direction and increase when the threaded rod is rotated in a counter-clockwise direction.

The member 84 acts to support means 30. Apertures 86 in the member are in contact with the bearing 78 located on the unthreaded portion of the bolt 70. Through this connection, member 84 acts to support the support members 66 and, in turn, the ends of the blower elements 20. Since aperture 86 in the member is in contact with the bearings on the bolt 70, the bolt is free to rotate within the aperture of the member.

The element 88 located on the end of member 84 that is spaced apart from the bolt 70 extends from the member into a support housing 90. The end of the flange that projects into the support housing is adapted with a threaded opening 94, and a threaded member 98 passes through apertures in the support housing and through the threaded opening in the element. When knob 104 on the threaded member is rotated, the threaded member also rotates. The rotation of the threaded member causes the element to advance along the threaded member as the threaded member passes through a threaded opening in the element. The rotation of the threaded member causes the element to move in a direction that is generally perpendicular to the longitudinal axes of the attenuated filaments. Since the element is connected by member 84, bolt 70 and support member 66 to the blower elements, when the element is moved this, in turn, causes the blower elements to move. Therefore, rotation of the threaded member 98 causes the blower elements to move in a direction that is generally perpendicular to the longitudinal axes of the attenuated filaments. It should be noted that rotation of threaded member 98 causes the blower elements to move uniformly in the same direction and does not alter the opening between the blower elements.

Member 110 projects from the support housing 90 into housing 112. The portion of the member that extends into the housing is adapted with a threaded opening 116. A threaded member 120 extends through apertures 118 in the end walls of the housing and also through the threaded opening 116 in the member. Knob 124 is located on one end of the threaded member and, when the knob is rotated, the threaded member also rotates. When the threaded member is rotated, the member 110 moves along the threaded member as the threaded member passes through a threaded opening in the member. The rotation of the threaded member causes the member to move in a direction that is substantially parallel to the longitudinal axes of the attenuated filaments. The member 110 is connected through the support housing 90, element 88, member 84 and support member 66 to the ends of the blower elements 20. Thus, when the member 110 moves in a direction that is generally parallel to the longitudinal axes of the attenuated filaments, the ends of the blower elements move in a direction that is generally parallel to the longitudinal axes of the attenuated filaments.

It should be noted that there are means 30, means 32 and means 34 for moving the blower elements relative to the tips located on each end of the blower elements. These means for moving the blower elements can be operated in conjunction with each other to move the entire blower elements in a uniform manner, or the means for moving the blower elements can be operated independently of one another so that the position of the blower elements will differ from one end of the feeder to the other.

Means 30, means 32 and means 34 can be used to position the blower elements so that the proper temperature and heat pattern are established in the feeder. In addition, the blower elements can be moved relative to the feeder to maintain the desired temperature and heat pattern. It should be noted that the above movement of the blower elements will be coordinated with any of the prior art adjustments for controlling the temperature and heat pattern of the feeder.

Having described the invention in detail and with reference to the drawings, it will be understood that such specifications are given for the sake of explanation. Various modifications and substitutes, other than those cited, can be made without departing from the scope of the invention as defined by the following claims.

We claim:

1. Apparatus for attenuating filaments from streams of molten material comprising:
    feeder means having a plurality of orifices adapted to supply a plurality of streams of molten material;
    a plurality of elements in spaced apart relationship adapted for the passage of a fluid therethrough to attenuate said streams into filaments along a path of advancement;
    first means for moving the elements to vary the space between the elements;
    second means for moving the elements in a direction substantially transverse to the path of said filaments being attenuated, the second means being connected to the first means; and
    third means for moving the elements in a direction substantially along the path of the filaments being attenuated, the third means being connected to the second means.

2. The apparatus of claim 1 wherein the first means is a screw.

3. The apparatus of claim 1 wherein there is a first means located at each end of the elements and the means can be operated independently of one another.

4. The apparatus of claim 1 wherein there is a second means located at each end of the elements and the means can be operated independently of one another.

5. The apparatus of claim 1 wherein the second means is a screw.

6. The apparatus of claim 1 wherein there is a third means located at each end of the elements and the means can be operated independently of one another.

7. The apparatus of claim 7 wherein the third means is a screw.

* * * * *